(12) United States Patent
Banhos et al.

(10) Patent No.: US 12,292,193 B2
(45) Date of Patent: May 6, 2025

(54) COMBUSTOR LINER WITH PATTERN OF VOIDS IN CMC FIBER PLY FOR COOLING CHANNELS

(71) Applicant: RAYTHEON TECHNOLOGIES CORPORATION, Farmington, CT (US)

(72) Inventors: Jonas Banhos, West Hartford, CT (US); James T. Roach, Vernon, CT (US); Russell Kim, Temecula, CA (US); Raymond Surace, Newington, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/343,198

(22) Filed: Jun. 28, 2023

(65) Prior Publication Data

US 2025/0003589 A1    Jan. 2, 2025

(51) Int. Cl.
*F23R 3/00* (2006.01)
*B32B 3/10* (2006.01)
(Continued)

(52) U.S. Cl.
CPC ............... *F23R 3/002* (2013.01); *B32B 3/10* (2013.01); *B32B 3/266* (2013.01); *B32B 5/02* (2013.01);
(Continued)

(58) Field of Classification Search
CPC . F23R 3/002; F23R 3/007; B32B 3/10; B32B 3/266; B32B 5/02; B32B 5/26;
(Continued)

(56) References Cited

U.S. PATENT DOCUMENTS 8,257,809 B2    9/2012  Morrison et al.
8,307,657 B2    11/2012 Chila
(Continued)

FOREIGN PATENT DOCUMENTS

| EP | 3453505 | 3/2019 |
|---|---|---|
| EP | 3839216 | 6/2021 |
| EP | 3839217 | 6/2021 |

OTHER PUBLICATIONS

Li, X., Hallett, S.R., and Wisnom, M.R. (2015). Modelling the effect of gaps and overlaps in automated fibre placement (AFP0-manufactured laminates. Science and Engineering of Composite Materials vol. 22(2). pp. 115-129.
(Continued)

*Primary Examiner* — Steven M Sutherland
(74) *Attorney, Agent, or Firm* — Carlson, Gaskey & Olds, P.C.

(57) ABSTRACT

A combustor includes a combustion chamber and a liner that bounds at least a portion of the combustion chamber. The liner includes a first side facing the combustion chamber and a second side facing away from the combustion chamber. The liner is formed of a lay-up of ceramic matrix composite (CMC) plies that have a first CMC ply on the first side, a second CMC ply on the second side, and intermediate CMC plies between the first and second CMC plies. At least one of the intermediate CMC plies has a pattern of voids that define cooling channels in the combustor panel. The cooling channels are bound on lateral channel sides by the at least one of the intermediate CMC plies.

9 Claims, 5 Drawing Sheets

(51) Int. Cl.
*B32B 3/26* (2006.01)
*B32B 5/02* (2006.01)
*B32B 5/26* (2006.01)

(52) U.S. Cl.
CPC .............. *B32B 5/26* (2013.01); *F23R 3/007* (2013.01); *B32B 2250/20* (2013.01); *B32B 2260/023* (2013.01); *B32B 2260/04* (2013.01); *B32B 2262/105* (2013.01)

(58) Field of Classification Search
CPC .......... B32B 2250/20; B32B 2260/023; B32B 2260/04; B32B 2262/105
See application file for complete search history.

(56) References Cited

U.S. PATENT DOCUMENTS

| | | |
|---|---|---|
| 11,174,752 B2 | 11/2021 | Dyson et al. |
| 11,226,099 B2 | 1/2022 | Freeman et al. |
| 11,326,470 B2 | 5/2022 | Dyson et al. |
| 11,346,228 B1* | 5/2022 | Burdette ................. F01D 9/044 |
| 2004/0194941 A1 | 10/2004 | Larrieu et al. |
| 2018/0017258 A1* | 1/2018 | Stieg ....................... F23R 3/007 |
| 2021/0229317 A1 | 7/2021 | Tura |

OTHER PUBLICATIONS

European Search Report for European Patent Application No. 24184978.5 mailed Oct. 25, 2024.

* cited by examiner

COMBUSTOR LINER WITH PATTERN OF VOIDS IN CMC FIBER PLY FOR COOLING CHANNELS

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature core gas flow. The high-pressure and temperature core gas flow expands through the turbine section to drive the compressor and the fan section. The compressor section may include low and high pressure compressors, and the turbine section may also include low and high pressure turbines.

Liners or panels in the combustor section are typically formed of a superalloy and typically include thermal barrier coatings to extend temperature capability and lifetime. Ceramic matrix composite ("CMC") materials are also being considered for combustor liners/panels. Among other attractive properties, CMCs have high temperature resistance. Despite this attribute, however, there are unique challenges to implementing CMCs in combustors.

SUMMARY

A combustor for a gas turbine engine according to an example of the present disclosure includes a combustion chamber and a liner that bounds at least a portion of the combustion chamber. The liner has a first side that faces the combustion chamber, a second side that faces away from the combustion chamber, and a lay-up of ceramic matrix composite (CMC) plies that has a first CMC ply on the first side, a second CMC ply on the second side, and intermediate CMC plies between the first and second CMC plies. At least one of the intermediate CMC plies has a pattern of voids that define cooling channels in the combustor panel. The cooling channels are bound on lateral channel sides by the at least one of the intermediate CMC plies.

In a further embodiment of any of the foregoing embodiments, the second CMC ply include at least one inlet hole connected to the cooling channels for providing cooling air through the combustor panel.

In a further embodiment of any of the foregoing embodiments, multiple ones of the intermediate CMC plies have the pattern of voids such that the cooling channels form a three-dimensional cooling network.

In a further embodiment of any of the foregoing embodiments, two or more congruent ones of the intermediate CMC plies have the pattern of voids such that the cooling channels have a thickness that is equal to two or more of the CMC plies.

In a further embodiment of any of the foregoing embodiments, the cooling channels have a thickness and the CMC plies each have a ply thickness, and the thickness of the cooling channels is a multiple of the ply thickness.

In a further embodiment of any of the foregoing embodiments, the CMC plies includes at least one outlet hole connected with the cooling channels and that opens to an exterior of the liner.

In a further embodiment of any of the foregoing embodiments, a group of congruent ones of the intermediate CMC plies has a group of cooling channels that are elongated in a first direction and has a first connector cooling channel that is elongated in an oblique direction to the first direction such that the first connector cooling channel intersects and connects the group of cooling channels.

A gas turbine engine according to an example of the present disclosure includes a compressor section, a combustor as recited in any of the preceding claims in fluid communication with the compressor section, and a turbine section in fluid communication with the combustor.

In a further embodiment of any of the foregoing embodiments, the second CMC ply includes at least one inlet hole connected to the cooling channels for providing cooling air through the combustor panel, and the CMC plies include at least one outlet hole connected with the cooling channels and that opens to an exterior of the liner.

In a further embodiment of any of the foregoing embodiments, multiple ones of the intermediate CMC plies have the pattern of voids such that the cooling channels form a three-dimensional cooling network, and two or more congruent ones of the intermediate CMC plies have the pattern of voids such that the cooling channels have a thickness that is equal to two or more of the CMC plies.

In a further embodiment of any of the foregoing embodiments, a group of congruent ones of the intermediate CMC plies has a group of cooling channels that are elongated in a first direction and has a first connector cooling channel that is elongated in an oblique direction to the first direction such that the first connector cooling channel intersects and connects the group of cooling channels.

A method of fabricating a combustor liner according to an example of the present disclosure includes laying-up at least one first ceramic fabric ply on a mandrel, and laying-up at least one discontinuous intermediate ceramic fabric ply on the at least one first ceramic fabric ply. The at least one discontinuous intermediate ceramic fabric ply has a pattern of voids. At least one second ceramic fabric ply is then paid-up on the at least one discontinuous intermediate ceramic fabric ply with the pattern of voids, the first ceramic fabric ply, the at least one discontinuous intermediate ceramic fabric ply, and the second ceramic fabric ply together provide a combustor liner fiber preform that is then densified with a ceramic matrix material to form a combustor liner. The pattern of voids defines cooling channels in the combustor liner.

A further embodiment of any of the foregoing embodiments includes cutting strips in at least one ceramic fabric ply to provide the at least one discontinuous intermediate ceramic fabric ply, and removing the strips from the at least one discontinuous intermediate ceramic fabric ply to provide the pattern of voids.

A further embodiment of any of the foregoing embodiments includes fabricating the at least one discontinuous intermediate ceramic fabric ply by additive manufacturing to provide the pattern of voids.

In a further embodiment of any of the foregoing embodiments, the additive manufacturing is automated fiber placement.

In a further embodiment of any of the foregoing embodiments, the at least one discontinuous intermediate ceramic fabric ply includes ceramic tows and non-ceramic fugitive tows, and the fugitive tows are thermally removed to provide the pattern of voids.

In a further embodiment of any of the foregoing embodiments, the non-ceramic fugitive tows are selected from carbon and polymer.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

Figure 1:
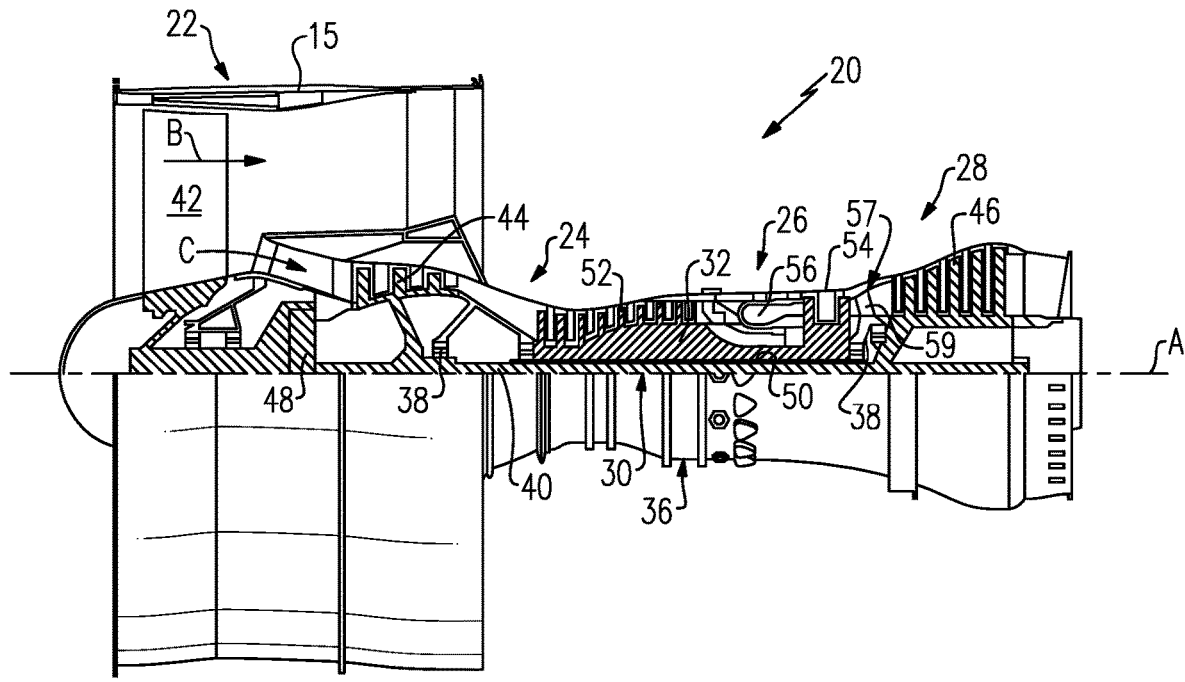
FIG. 1 illustrates a gas turbine engine.

In this disclosure, like reference numerals designate like elements where appropriate and reference numerals with the addition of one-hundred or multiples thereof designate modified elements that are understood to incorporate the same features and benefits of the corresponding elements. Terms such as "first" and "second" used herein are to differentiate that there are two architecturally distinct components or features. Furthermore, the terms "first" and "second" are interchangeable in that a first component or feature could alternatively be termed as the second component or feature, and vice versa.

DETAILED DESCRIPTION

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of [(Tram °R)/(518.7 °R)]$^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
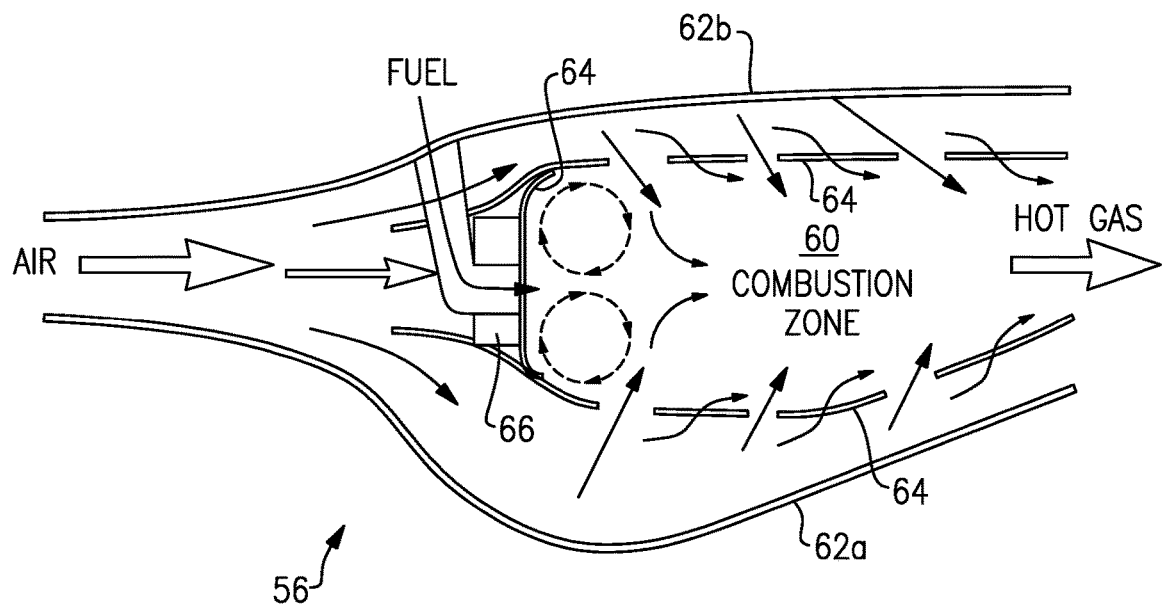
FIG. 2 illustrates a combustor of the engine.

FIG. 2 illustrates selected portions of the combustor 56. The combustor 56 may have an annular configuration, a can configuration, or "cannular" configuration, as are known. In general, the combustor 56 includes a combustion chamber 60 radially between inner and outer wall portions 62a/62b. A liner 64 disposed around the combustion chamber 60 thermally shields the wall portions 62a/62b. Depending on the configuration of the combustor 56, the liner 64 (or portions of the liner 64) may be a continuous full hoop about the engine central longitudinal axis A or a segmented arrangement of discreet panels. Pressurized air from the compressor section 24 is provided at the upstream end of the combustor 56. A portion of the air flows into one or more fuel nozzles 66, where it is mixed with fuel for combustion in the chamber 60. Other portions of the air flow to the liner 64 for cooling and/or injection through dilution holes into the combustion chamber 60.

Figure 3:
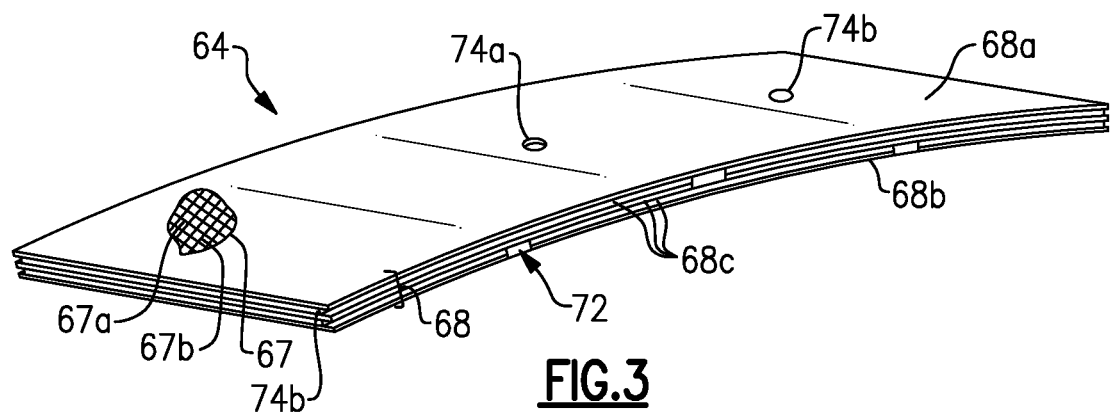
FIG. 3 illustrates an example of a portion of a liner of a combustor.

The liner 64 is formed of a ceramic matrix composite (CMC) 67 (shown in partial cutaway view in FIG. 3). For example, the CMC 67 includes ceramic fiber tows 67a that are disposed in a ceramic matrix 67b. The CMC 67 may be, but is not limited to, a SiC/SiC ceramic matrix composite in which SiC fiber tows are disposed within a SiC matrix. The fiber tows are provided as a ceramic fabric and arranged in a fiber architecture in the fabric (e.g. examples include but are not limited to braided or harness satin weave). As will be described in further detail later on below, the fabric is laid-up, layer-upon-layer, to provide the liner 64.

Figure 4:
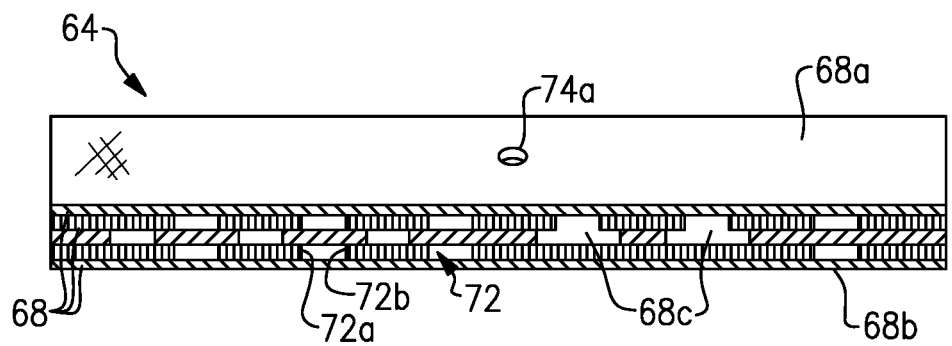
FIG. 4 illustrates a sectioned view of the liner.
Figure 5:
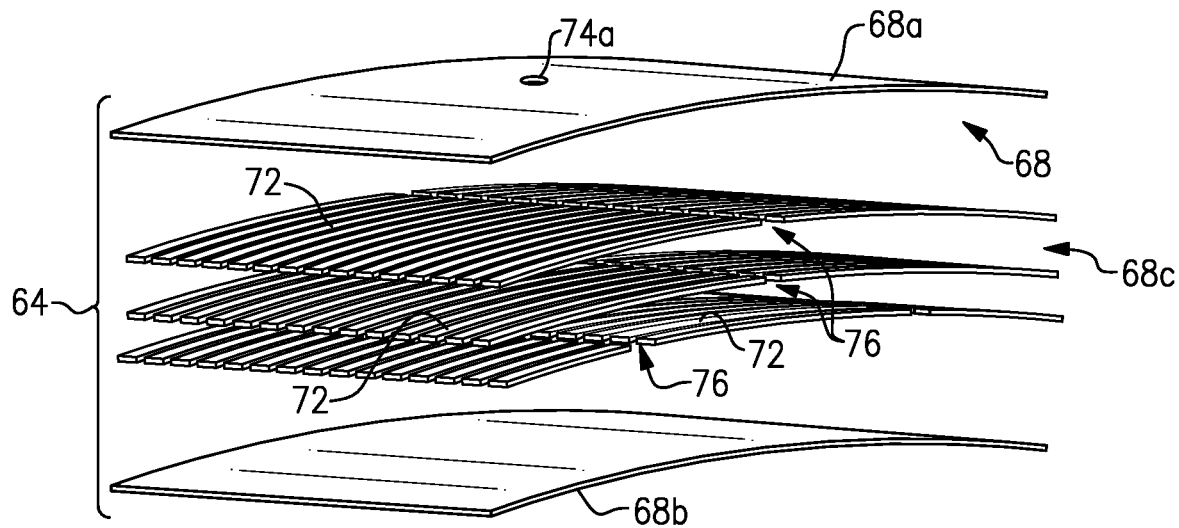
FIG. 5 illustrates an expanded view of the liner.

FIG. 3 illustrates an isometric view of an example of the liner 64 (as shown, a panel), FIG. 4 illustrates a side view of the liner 64, and FIG. 5 illustrates an expanded view of the liner 64. The liner 64 is formed of a lay-up of CMC plies 68 that include at least one first CMC ply 68a, at least one second CMC ply 68b, and intermediate CMC plies 68c located between the CMC plies 68a/68b. The terminology "first" and "second" as used herein is to differentiate that there are two architecturally distinct components or features. It is to be further understood that the terms "first" and "second" are interchangeable in the embodiments herein in that a first component or feature could alternatively be termed throughout as the second component or feature, and vice versa.

In the illustrated example, each of the first CMC ply 68a and the second CMC ply 68b are double layers of fabric but could alternatively be single layers or have more than two layers. The plies 68a/68b are continuous plies in that, except for cooling through-holes, extend uninterrupted throughout the liner 64.

At least one of the intermediate CMC plies 68c has a pattern of voids 72 that serve as cooling channels in the liner 64. A "pattern of voids" is a distinctive, non-random arrangement of empty spaces, usually in a repeated configuration through the liner 64. The liner 64 includes at least one inlet hole 74a connected to the cooling channels that serves as a feed port for incoming cooling air into the liner 64. The liner 64 may also include one or more outlet holes 74b through the first CMC ply 68a and/or the second CMC ply 68b, or at an edge of the liner 64, for discharge of cooling air from the liner 64.

Each cooling channel is bound on lateral channel sides 72a/72b by the at least one of the intermediate CMC plies 68c and is bound on an inner and outer channel sides by adjacent ones of the CMC plies 68 (e.g. either another of the intermediate CMC plies 68c, the first CMC ply 68a, or the second CMC ply 68b). In the illustrated example, two congruent ones of the intermediate CMC plies 68c have a pattern of voids 72 such that the cooling channels, at least in some locations where the patterns coincide, have a thickness that is equal to two of the CMC plies 70. A thickness of two or more plies facilitates good flow and cooling but also permits the flow to move through the thickness of the liner 64, i.e., a 3D cooling circuit, which may facilitate reductions in thermal gradients in the liner 64 as well as aid processing during densification by providing open pathways for flow of materials and/or precursors. Moreover, with improved cooling, mass flow of cooling air may be reduced.

Figure 6:
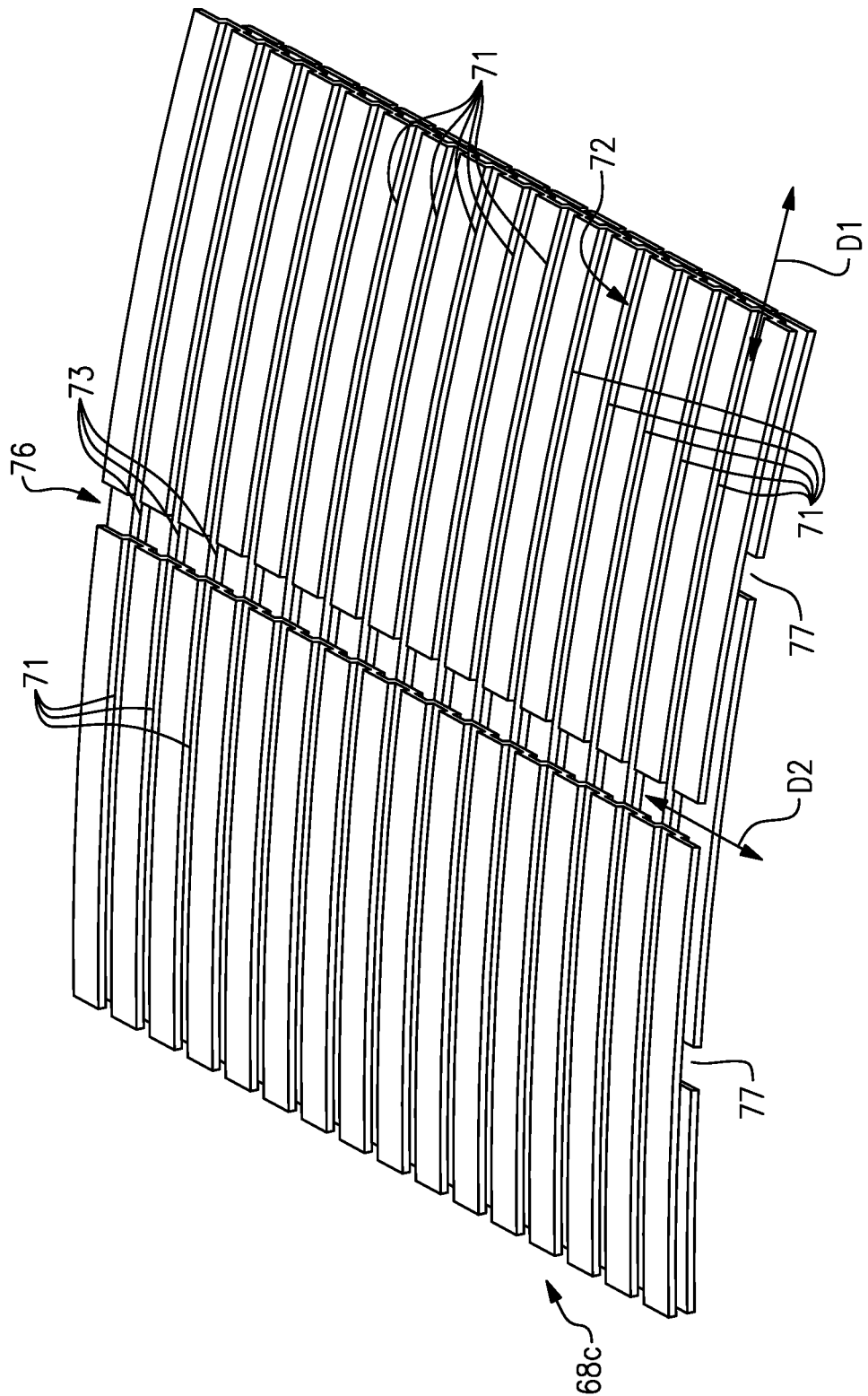
FIG. 6 illustrates a view of the intermediate plies of the liner.

FIG. 6 is an isometric view of the intermediate CMC plies 68c with the pattern of voids 72 (i.e., the cooling channels) in the liner 64, without the first and second CMC plies 68a/68b. The group of cooling channels 71 in the top one of the intermediate CMC plies 68c are substantially parallel and are elongated in a first direction (D1). One or more connector cooling channels 76 (also visible in FIG. 5) that is/are elongated in an oblique direction (D2) to the first direction (D1) such that the connector cooling channel 76 intersects and connects the group of cooling channels 71 in that top intermediate CMC ply 68c. The next adjacent (middle) intermediate CMC ply 68c is mostly obstructed from view in FIG. 6 but has a similar pattern of cooling channels 73. However, the channels 73 are offset from the channels 71 in the top intermediate CMC ply 68c. The connector cooling channel 76 of the top intermediate CMC ply 68c passes over the channels 73 of the middle intermediate CMC ply 68c and thus provides a path for cooling air to flow between the top and middle plies 68c via the channels 71 and 73. The middle intermediate CMC ply 68c also has one or more connector cooling channels 77. The bottom intermediate CMC ply 68c (obstructed from view) also has a similar pattern of cooling channels, but the channels are offset from the channels 73 of the middle intermediate CMC ply 68c. However, the connector cooling channel 77 of the middle intermediate CMC ply 68c passes over the channels of the bottom intermediate CMC ply 68c and thus provides a path for cooling air to flow between middle and bottom plies 68c via the channels 73 and 77. In this manner, the connector cooling channels 76/77, together with the parallel channels 71/73 in the respective intermediate CMC plies 68c provide for circulation of cooling air in a three-dimensional cooling network. It is to be appreciated, however, that the pattern, number, and spacing of the cooling channels may be modified to meet cooling requirements.

Figure 7:
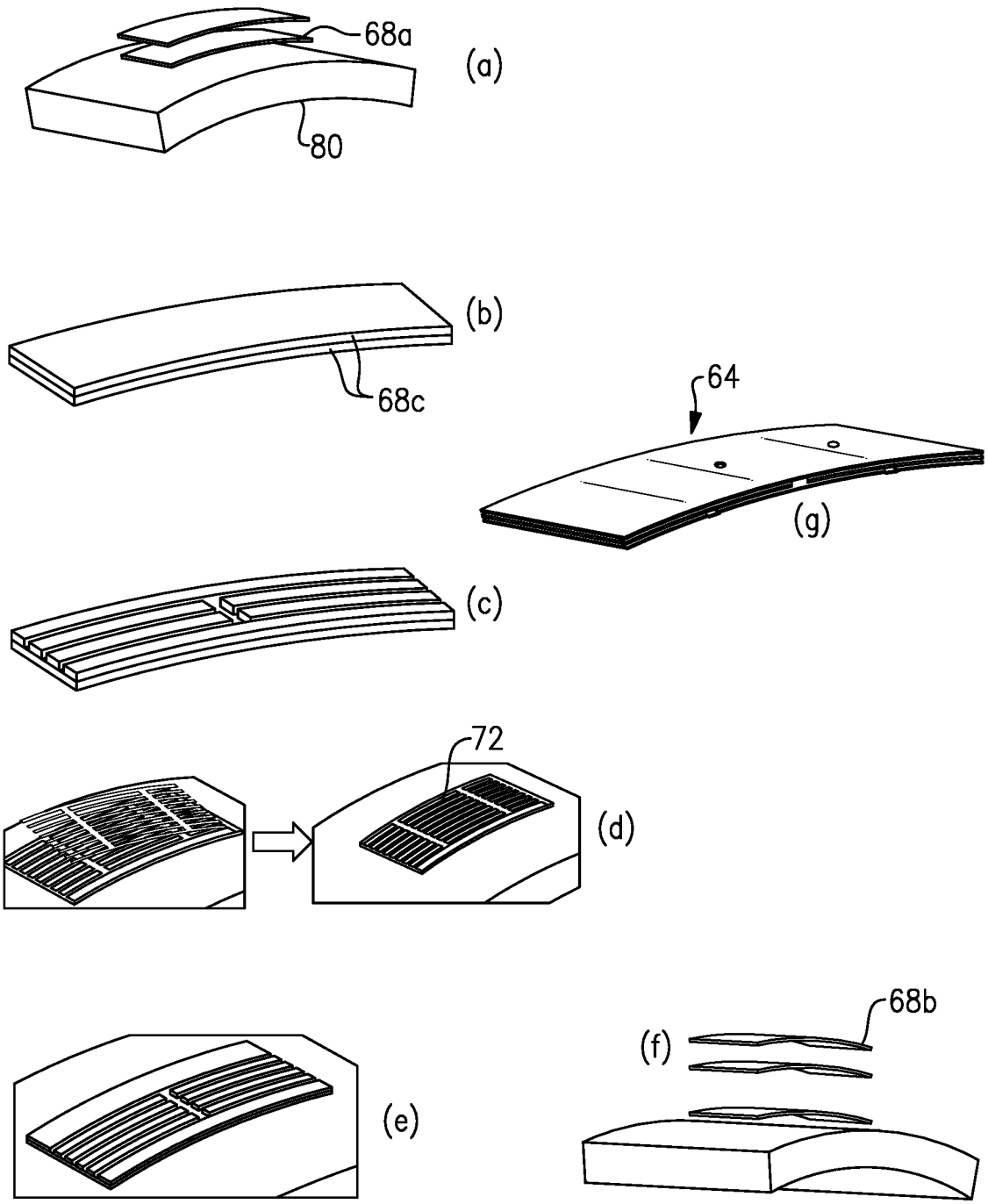
FIG. 7 depicts a method of fabricating a liner.

FIG. 7 depicts an example method for fabricating the liner 64. At step (a), at least one first ceramic fabric ply 68a is laid-up on a mandrel 80. For example, to make a double layer, two layers of ceramic fabric are arranged onto the mandrel 80. At step (b), two intermediate ceramic fabric plies 68c are attached back-to-back. For example, the plies may be bonded together using a tackifier, such as polyvinyl alcohol or polyvinyl butyral. The bonding facilitates keeping the plies aligned for subsequent steps. At step (c), a pattern of strips are cut in one of the plies from step (b) to form a discontinuous intermediate CMC ply 68c. As an example, laser-cutting may be used but other cutting techniques may alternatively be used. At step (d), the cut intermediate ceramic fabric plies 68c from step (c) are laid-up on the first ceramic fabric ply 68a from step (a) and then the cut pattern of strips is removed from the cut ceramic fabric plies, leaving the pattern of voids 72. At step (e), the process steps (b), (c), and (d) are repeated to lay-up additional intermediate ceramic fabric plies 68c and patterns of voids 72 to a desired layer thickness and configuration of cooling channels. At step (f), one or more ceramic fabric layers are laid-up on the aforementioned plies to form the second ceramic fabric ply 68b, resulting in a liner fiber preform. Finally, at step (g), the fiber preform is densified with the ceramic matrix material to form the liner 64. For example, the matrix material is deposited by chemical vapor infiltration, polymer infiltration and pyrolysis, melt infiltration, combinations thereof, or other methods of matrix formation.

Figure 8:
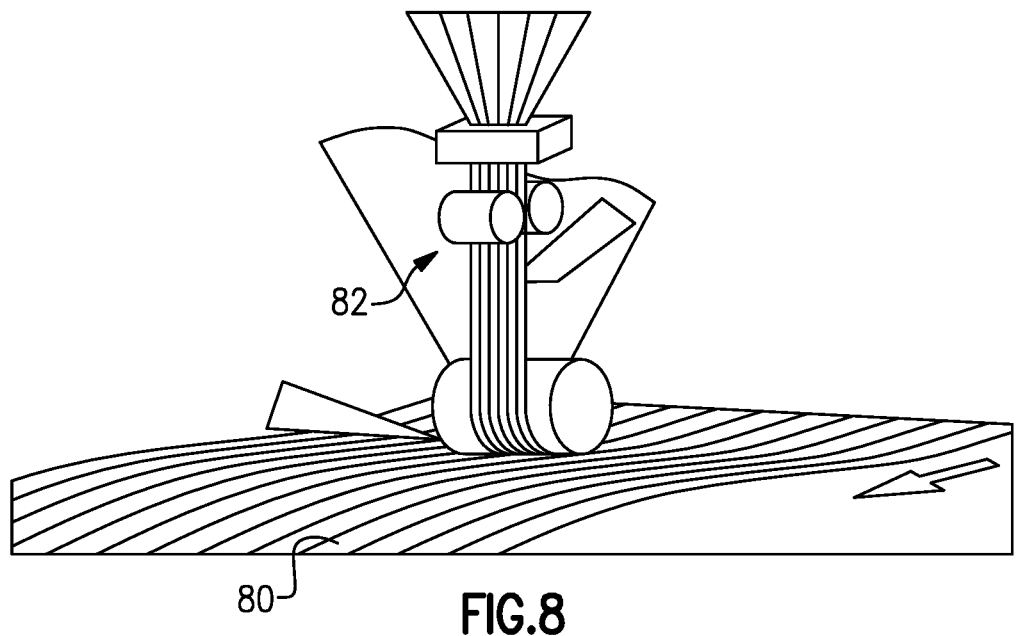
FIG. 8 illustrates an automated fiber placement process.

Fabrication of the liner 64 is not limited to the process depicted in FIG. 7. As an example, one alternative to cutting the pattern of voids 72 in the intermediate ceramic fabric plies 68c is forming the pattern of voids 72 by an additive manufacturing process, such as an automated fiber placement process depicted in FIG. 8. For instance, in accordance with computer-aided design data that contains a representation of the pattern of voids that is to be built, a fiber tow head 82 precisely lays fiber tows on the mandrel 80 or other molding surface to form the intermediate ceramic fabric plies 68c with the pattern of voids 72 where no fiber tows are deposited. A roller 84 may follow for compaction of the fiber tows onto the surface.

Figure 9:
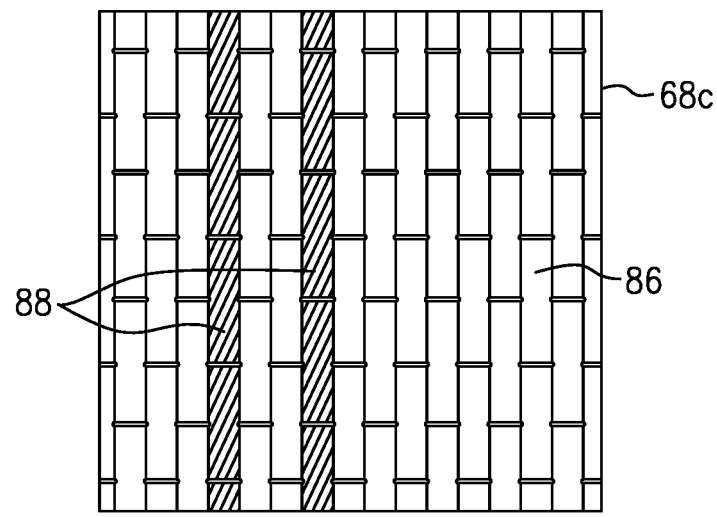
FIG. 9 illustrates a lay-up with non-ceramic fugitive fiber tows.

In another alternative depicted in FIG. 9, the intermediate ceramic fabric plies 68c include ceramic fiber tows 86 and non-ceramic fugitive tows 88, such as tows made of carbon or polymer (e.g., polyvinyl alcohol). The intermediate ceramic fabric plies 68c are laid up between the first and second ceramic fiber plies 68a/68b, and then the resulting fiber preform is thermally treated to volatilize and remove the fugitive tows 88, and thereby provide the pattern of voids 72. For instance, the thermal treatment may be combined into the densification if elevated temperatures are used for the densification process.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A combustor for a gas turbine engine comprising:
   a combustion chamber;
   a liner bounding at least a portion of the combustion chamber, the liner including:
      a first side facing the combustion chamber,
      a second side facing away from the combustion chamber, and
      a lay-up of ceramic matrix composite (CMC) plies having a first CMC ply on the first side, a second CMC ply on the second side, and intermediate CMC plies between the first and second CMC plies, at least one of the intermediate CMC plies having a pattern of voids that define cooling channels in the liner, the cooling channels being bound on lateral channel sides by the at least one of the intermediate CMC plies, wherein a group of congruent ones of the intermediate CMC plies has a group of cooling channels that are elongated in a first direction and has a first connector cooling channel that is elongated in an oblique direction to the first direction such that the first connector cooling channel intersects and connects the group of cooling channels.

2. The combustor as recited in claim 1, wherein the second CMC ply includes at least one inlet hole connected to the cooling channels for providing cooling air through the liner.

3. The combustor as recited in claim 1, wherein multiple ones of the intermediate CMC plies have the pattern of voids such that the cooling channels form a three-dimensional cooling network.

4. The combustor as recited in claim 1, wherein two or more congruent ones of the intermediate CMC plies have the pattern of voids such that the cooling channels have a thickness that is equal to two or more of the CMC plies.

5. The combustor as recited in claim 1, wherein the cooling channels have a thickness and the CMC plies each have a ply thickness, and the thickness of the cooling channels is a multiple of the ply thickness.

6. The combustor as recited in claim 1, wherein the CMC plies includes at least one outlet hole connected with the cooling channels and that opens to an exterior of the liner.

7. A gas turbine engine comprising:
   a compressor section;
   a combustor in fluid communication with the compressor section; and
   a turbine section in fluid communication with the combustor, the combustor including
      a combustion chamber, and
      a liner bounding at least a portion of the combustion chamber, the liner including:
         a first side facing the combustion chamber,
         a second side facing away from the combustion chamber, and
         a lay-up of ceramic matrix composite (CMC) plies having a first CMC ply on the first side, a second CMC ply on the second side, and intermediate CMC plies between the first and second CMC plies, at least one of the intermediate CMC plies having a pattern of voids that define cooling channels in the liner, the cooling channels being bound on lateral channel sides by the at least one of the intermediate CMC plies, wherein a group of congruent ones of the intermediate CMC plies has a group of cooling channels that are elongated in a first direction and has a first connector cooling channel that is elongated in an oblique direction to the first direction such that the first connector cooling channel intersects and connects the group of cooling channels.

8. The gas turbine engine as recited in claim 7, wherein the second CMC ply includes at least one inlet hole connected to the cooling channels for providing cooling air through the liner, and the CMC plies include at least one outlet hole connected with the cooling channels and that opens to an exterior of the liner.

9. The gas turbine engine as recited in claim 8, wherein multiple ones of the intermediate CMC plies have the pattern of voids such that the cooling channels form a three-dimensional cooling network, and two or more congruent ones of the intermediate CMC plies have the pattern of voids such that the cooling channels have a thickness that is equal to two or more of the CMC plies.

\* \* \* \* \*